(12) United States Patent  
Smith et al.

(10) Patent No.: US 8,284,749 B2  
(45) Date of Patent: Oct. 9, 2012

(54) TIME SLOT SYNCHRONIZED, FLEXIBLE BANDWIDTH COMMUNICATION SYSTEM

(75) Inventors: R. Clayton Smith, Boulder, CO (US); Luis G. Jordan, Charles Town, WV (US); Scott A. McDermott, Washington, DC (US)

(73) Assignee: Comtech Mobile Datacom Corporation, Germantown, MD (US)

( * ) Notice: Subject to any disclaimer, the term of this patent is extended or adjusted under 35 U.S.C. 154(b) by 779 days.

(21) Appl. No.: 12/396,447

(22) Filed: Mar. 2, 2009

(65) Prior Publication Data

US 2009/0257422 A1    Oct. 15, 2009

Related U.S. Application Data

(60) Provisional application No. 61/035,058, filed on Mar. 10, 2008, provisional application No. 61/035,546, filed on Mar. 11, 2008.

(51) Int. Cl.  
*H04B 7/216* (2006.01)

(52) U.S. Cl. ............... 370/342; 370/328; 455/552.1

(58) Field of Classification Search ........... 370/342, 370/345, 311, 316, 328, 347, 208; 455/424, 455/458, 425, 552.1  
See application file for complete search history.

(56) References Cited

U.S. PATENT DOCUMENTS

| | | |
|---|---|---|
| 4,486,739 A | 12/1984 | Franaszek et al. |
| 4,649,396 A | 3/1987 | Friedman |
| 4,876,737 A | 10/1989 | Woodworth et al. |
| 4,901,307 A | 2/1990 | Gilhousen et al. |
| 5,109,390 A | 4/1992 | Gilhousen et al. |
| 5,309,474 A | 5/1994 | Gilhousen et al. |
| 5,376,778 A | 12/1994 | Kreft |
| 5,490,165 A | 2/1996 | Blakeney, II et al. |
| 5,537,397 A | 7/1996 | Abramson |
| 5,559,790 A | 9/1996 | Yano et al. |
| 5,566,168 A | 10/1996 | Dent |
| 5,568,472 A * | 10/1996 | Umeda et al. ............ 370/342 |

(Continued)

FOREIGN PATENT DOCUMENTS

DE    102004016548 A1    10/2005

(Continued)

OTHER PUBLICATIONS

McDermott, Specification and Drawings, U.S. Appl. No. 11/876,747, Oct. 22, 2007, 28 pgs.

(Continued)

*Primary Examiner* — Andrew Lai  
(74) *Attorney, Agent, or Firm* — Morgan, Lewis & Bockius LLP (57) ABSTRACT

One or more frame slots to each transceiver are allocated for communication within each message cycle. The number of frame slots allocated can be dynamically adjusted to accommodate variable traffic loads per transceiver, and an offset of the frame slots within the message cycle is preferably predefined to provide a uniform distribution among the transceivers. The design of the transceiver is independent of the particular application, having at least one programmable parameter that controls the number of frame slots allocated within the message cycle. By controlling the number of frame slots allocated to a transceiver, the amount of inactive time, and hence battery life, can be controlled. When a conflict occurs among multiple transceivers having pending messages at the same frame slot, the allocation of the frame slot to a transceiver is based at least in part on the resultant lag time to each transceiver.

22 Claims, 3 Drawing Sheets

U.S. PATENT DOCUMENTS

| | | | |
|---|---|---|---|
| 5,625,629 A * | 4/1997 | Wenk | 370/347 |
| 5,640,166 A | 6/1997 | Siwiak | |
| 5,668,556 A | 9/1997 | Rouffet et al. | |
| 5,697,050 A | 12/1997 | Wiedeman | |
| 5,724,384 A | 3/1998 | Kim et al. | |
| 5,758,260 A | 5/1998 | Wiedeman | |
| 5,790,070 A | 8/1998 | Natarajan et al. | |
| 5,796,777 A | 8/1998 | Terlep et al. | |
| 5,815,071 A | 9/1998 | Doyle | |
| 5,835,069 A | 11/1998 | Skoog | |
| 5,872,777 A | 2/1999 | Brailean et al. | |
| 5,920,278 A | 7/1999 | Tyler et al. | |
| 5,983,111 A | 11/1999 | Kim | |
| 6,052,561 A | 4/2000 | Rudowicz et al. | |
| 6,088,413 A | 7/2000 | Autry et al. | |
| 6,100,806 A | 8/2000 | Gaukel | |
| 6,121,922 A | 9/2000 | Mohan | |
| 6,128,469 A | 10/2000 | Zenick, Jr. et al. | |
| 6,151,313 A | 11/2000 | Abramson | |
| 6,163,681 A | 12/2000 | Wright et al. | |
| 6,185,245 B1 | 2/2001 | Kim | |
| 6,188,682 B1 | 2/2001 | Takagi et al. | |
| 6,205,167 B1 | 3/2001 | Kamgar et al. | |
| 6,307,840 B1 | 10/2001 | Wheatley, III et al. | |
| 6,317,029 B1 | 11/2001 | Fleeter | |
| 6,339,611 B1 | 1/2002 | Antonio et al. | |
| 6,349,110 B1 | 2/2002 | Davidovici et al. | |
| 6,353,730 B1 | 3/2002 | Buettner et al. | |
| D455,641 S | 4/2002 | Trifilio | |
| 6,373,831 B1 | 4/2002 | Secord et al. | |
| 6,396,819 B1 | 5/2002 | Fleeter et al. | |
| 6,421,373 B1 | 7/2002 | Saito | |
| 6,510,172 B1 | 1/2003 | Miller | |
| 6,549,559 B2 | 4/2003 | Kamgar et al. | |
| 6,574,205 B1 | 6/2003 | Sato | |
| 6,628,699 B2 | 9/2003 | Ramberg et al. | |
| 6,639,906 B1 | 10/2003 | Levin | |
| 6,683,605 B1 | 1/2004 | Bi et al. | |
| 6,720,801 B2 | 4/2004 | Houlberg | |
| 6,728,298 B1 | 4/2004 | Okubo et al. | |
| 6,754,190 B2 | 6/2004 | Gurney et al. | |
| 6,763,056 B1 | 7/2004 | Ohsuge | |
| 6,768,729 B1 | 7/2004 | Ohsuge | |
| 6,799,094 B1 | 9/2004 | Vaida et al. | |
| 6,876,645 B1 | 4/2005 | Guey et al. | |
| 6,894,995 B2 | 5/2005 | Chitrapu et al. | |
| 6,944,149 B1 | 9/2005 | Kim et al. | |
| 6,985,512 B1 | 1/2006 | McDermott et al. | |
| 7,006,032 B2 | 2/2006 | King et al. | |
| 7,053,767 B2 | 5/2006 | Petite et al. | |
| 7,110,435 B1 | 9/2006 | Sorrells et al. | |
| 7,131,136 B2 | 10/2006 | Monroe | |
| 7,203,630 B2 | 4/2007 | Kolb et al. | |
| 7,227,884 B2 | 6/2007 | McDermott | |
| 7,236,778 B2 | 6/2007 | Schreiber | |
| D554,474 S | 11/2007 | Miller | |
| D574,221 S | 8/2008 | Allen | |
| 7,433,391 B2 | 10/2008 | Stafford et al. | |
| D582,918 S | 12/2008 | Scott | |
| 7,592,953 B2 | 9/2009 | Morana | |
| 2002/0024965 A1 | 2/2002 | Lee | |
| 2002/0089434 A1 | 7/2002 | Ghazarian | |
| 2002/0097690 A1 * | 7/2002 | Fleeter et al. | 370/316 |
| 2002/0173888 A1 | 11/2002 | Shelton et al. | |
| 2002/0177476 A1 | 11/2002 | Chou | |
| 2002/0191632 A1 | 12/2002 | McDermott | |
| 2003/0161428 A1 | 8/2003 | Garrett et al. | |
| 2003/0202485 A1 * | 10/2003 | Mansfield | 370/328 |
| 2004/0008253 A1 | 1/2004 | Monroe | |
| 2004/0029579 A1 * | 2/2004 | Kashiwase | 455/424 |
| 2004/0029615 A1 | 2/2004 | Gerry et al. | |
| 2004/0117611 A1 | 6/2004 | Huber et al. | |
| 2004/0121729 A1 | 6/2004 | Herndon et al. | |
| 2004/0183673 A1 | 9/2004 | Nageli | |
| 2004/0246104 A1 | 12/2004 | Baechtiger et al. | |
| 2005/0038601 A1 | 2/2005 | Dentinger et al. | |
| 2005/0041573 A1 * | 2/2005 | Eom et al. | 370/208 |
| 2005/0060339 A1 | 3/2005 | McGee | |
| 2005/0076034 A1 | 4/2005 | Addonisio et al. | |
| 2005/0143005 A1 | 6/2005 | Moore, III | |
| 2005/0201311 A1 * | 9/2005 | Willey et al. | 370/311 |
| 2005/0248456 A1 | 11/2005 | Britton, Jr. et al. | |
| 2005/0281319 A1 | 12/2005 | Schilling | |
| 2006/0055561 A1 | 3/2006 | Kamali et al. | |
| 2006/0094450 A1 * | 5/2006 | Park et al. | 455/458 |
| 2006/0140314 A1 | 6/2006 | Kim et al. | |
| 2006/0141930 A1 | 6/2006 | Keen et al. | |
| 2006/0187026 A1 | 8/2006 | Kochis | |
| 2006/0251107 A1 | 11/2006 | Geren et al. | |
| 2007/0031150 A1 | 2/2007 | Fisher et al. | |
| 2007/0040647 A1 | 2/2007 | Saenz et al. | |
| 2007/0116158 A1 | 5/2007 | Guo et al. | |
| 2007/0117515 A1 | 5/2007 | Sinibaldi et al. | |
| 2007/0130599 A1 | 6/2007 | Monroe | |
| 2007/0291826 A1 | 12/2007 | Hafuka | |
| 2007/0293149 A1 | 12/2007 | Wubker | |
| 2007/0298786 A1 | 12/2007 | Meyers et al. | |
| 2008/0030345 A1 | 2/2008 | Austin et al. | |
| 2009/0135954 A1 | 5/2009 | Salhov et al. | |
| 2009/0175299 A1 | 7/2009 | Hosokawa et al. | |

FOREIGN PATENT DOCUMENTS

EP          1406207 A1          4/2004

OTHER PUBLICATIONS

Berthet, Synchronization Complexity for a Satellite Multimedia Burst Receiver, [date], 5 pgs.

Evans, Satellite Communication Systems 3rd edition, Jan. 2009, cover page and p. 468.

Fleeter, Notice of Allowance and Fees Due, U.S. Appl. No. 10/054,175, Aug. 18, 2004, 7 pgs.

Fleeter, Office Action, U.S. Appl. No. 09/130,854, Nov. 22, 2000, 7 pgs.

Fleeter, Office Action, U.S. Appl. No. 10/992,173, Apr. 8, 2011, 14 pgs.

Fleeter, Final Office Action, U.S. Appl. No. 10/992,173, Oct. 12, 2011, 15 pgs.

Franke, Choosing the best hardware form-factor for the airborne domain of the Joint Tactical Terminal (JTT) and Joint Tactical Radio System (JTRS), Aug. 6, 2002, 8 pgs.

Handermann, Notice of Allowance and Fees Due, U.S. Appl. No. 11/685,936, Dec. 1, 2009, 6 pgs.

Handermann, Office Action, U.S. Appl. No. 11/685,936, Sep. 9, 2009, 22 pgs.

Handermann, Office Action, U.S. Appl. No. 11/685,936, Oct. 20, 2008, 16 pgs.

Handermann, Supplemental Notice of Allowability, U.S. Appl. No. 11/685,936, Dec. 15, 2009, 4 pgs.

Harms, The Orbcomm Experience, EMPS 2004, Sep. 2004, 6 pgs.

Holm, Why convert to a SAASM-based Global Positioning System?, Military Embedded Systems, Oct. 2005, 3 pgs.

International Search Report and Written Opinion, PCT/US2006/042524, Apr. 22, 2008, 13 pgs.

International Search Report and Written Opinion, PCT/US2006/049656, Feb. 21, 2008, 12 pgs.

International Search Report and Written Opinion, PCT/US2007/063986, Oct. 26, 2007, 12 pgs.

Jordan, Final Office Action, U.S. Appl. No. 11/936,784, Nov. 7, 2011, 16 pgs.

Jordan, Office Action, U.S. Appl. No. 11/936,784, Aug. 27, 2010, 12 pgs.

McDermott, Notice of Allowance and Fees Due, U.S. Appl. No. 11/739,377, Dec. 14, 2011, 7 pgs.

McDermott, Notice of Allowance and Fees Due, U.S. Appl. No. 09/513,962, Sep. 9, 2005, 4 pgs.

McDermott, Notice of Allowance and Fees Due, U.S. Appl. No. 10/208,882, Apr. 10, 2007, 8 pgs.

McDermott, Notice of Allowance and Fees Due, U.S. Appl. No. 11/876,747, Jun. 3, 2009, 7 pgs.

McDermott, Office Action, U.S. Appl. No. 09/513,962, Sep. 14, 2004, 6 pgs.

McDermott, Final Office Action, U.S. Appl. No. 09/513,962, Apr. 16, 2004, 10 pgs.
McDermott, Office Action, U.S. Appl. No. 09/513,962, Jun. 24, 2003, 10 pgs.
McDermott, Final Office Action, U.S. Appl. No. 09/513,962, May 27, 2005, 9 pgs.
McDermott, Office Action, U.S. Appl. No. 11/739,377, Aug. 23, 2011, 17 pgs.
McDermott, Office Action, U.S. Appl. No. 11/876,747, Nov. 28, 2008, 5 pgs.
McDermott, Office Action, U.S. Appl. No. 10/208,882, Jan. 3, 2007, 11 pgs.
Meyers, Notice of Allowance and Fees Due, U.S. Appl. No. 11/592,008, Aug. 26, 2010, 10 pgs.
Meyers, Office Action, U.S. Appl. No. 11/592,008, Feb. 3, 2010, 24 pgs.
Meyers, Office Action, U.S. Appl. No. 11/592,008, Aug. 15, 2008, 18 pgs.
Meyers, Office Action, U.S. Appl. No. 11/592,008, May 18, 2010, 25 pgs.
Meyers, Office Action, U.S. Appl. No. 11/592,008, Mar. 19, 2009, 25 pgs.
Meyers, Office Action, U.S. Appl. No. 11/592,008, Sep. 21, 2009, 24 pgs.
Morana, Notice of Allowance and Fees Due, U.S. Appl. No. 11/618,379, May 13, 2009, 4 pgs.
Morana, Office Action, U.S. Appl. No. 11/618,379, Jan. 6, 2009, 7 pgs.
Morana, Office Action, U.S. Appl. No. 12/585,056, Oct. 13, 2011, 8 pgs.
Morana, Office Action, U.S. Appl. No. 29/270,057, Feb. 26, 2009, 5 pgs.
Ormesher, Current Radar Responsive Tag Development Activities at Sandia National Laboratories, Proc. of SPIE vol. 5410, 2004, 7 pgs.
Skiscim, Notice of Allowance and Fees Due, U.S. Appl. No. 12/101,391, Jul. 22, 2011, 18 pgs.
Skiscim, Office Action, U.S. Appl. No. 12/101,391, Jan. 4, 2011, 14 pgs.
Stafford, Notice of Allowance and Fees Due, U.S. Appl. No. 11/681,759, Aug. 13, 2008, 7 pgs.
Stafford, Notice of Allowance and Fees Due, U.S. Appl. No. 11/937,826, Jul. 29, 2011, 8 pgs.
Stafford, Final Office Action, U.S. Appl. No. 11/681,759, May 20, 2008, 8 pgs.
Stafford, Office Action, U.S. Appl. No. 11/681,759, Dec. 21, 2007, 7 pgs.
Stafford, Office Action, U.S. Appl. No. 11/937,826, Sep. 16, 2010, 5 pgs.
Summers, Plug and play testbed to enable responsive space missions, IEEE paper #1221, Mar. 5-12, 2005, 8 pgs.
Zenick Jr., Notice of Allowance and Issue Fee Due, U.S. Appl. No. 09/045,970, Sep. 24, 2001, 2 pgs.
Zenick Jr., Office Action, U.S. Appl. No. 09/045,970, Apr. 10, 2001, 4 pgs.
Zenick Jr., Office Action, U.S. Appl. No. 09/045,970, Oct. 25, 2001, 3 pgs.

* cited by examiner

TIME SLOT SYNCHRONIZED, FLEXIBLE BANDWIDTH COMMUNICATION SYSTEM

This application claims the benefit of U.S. Provisional Patent Applications 61/035,058, filed 10 Mar. 2008, and 61/035,546, filed 11 Mar. 2008

BACKGROUND AND SUMMARY OF THE INVENTION

This invention relates to the field of communications, and in particular to a base station that communicates with a plurality of remote devices using a message cycle that includes a fixed number of frame slots, and each remote device is configured to communicate at a defined frame rate at one or more frame slots within the message cycle.

A number of opportunities exist for the communication of short but informative messages between a plurality of remote devices and a base station.

A particularly unique application for transmitting short and informative messages from remote devices to a base station includes the "SPOT" system (SPOT Satellite GPS Messenger™, SPOT LLC, a wholly-owned subsidiary of Globalstar Inc.) that is configured to transmit, periodically or on demand, "I'm OK", or "I need help" messages with GPS coordinates. The base station is configured to relay the "I'm OK" messages with coordinates via e-mails to recipients associated with each particular transmitter, and to relay the "I need help" messages with coordinates in an alert with coordinates to an emergency service associated with the coordinates. In like manner, a low-cost "OnStar"-like system can be deployed on vehicles, such that if an accident or malfunction is sensed, a request for assistance is automatically transmitted. Similarly, location-reporting units can be deployed on taxis, trucks, service vehicles, and the like, to provide dispatchers and others with up to date status information.

Opportunities also exist for the communication of short but informative messages from the base station to the remote devices. Paging systems are classic examples of systems that provide short but informative messages. In like manner, in the aforementioned emergency notification system, for example, an acknowledgement of receipt of each message is desirable to reassure the user that the alarm has been received. Subsequently, periodic updates would also be desirable, providing, for example, the estimated time of arrival of the respondent aid. Similarly, the base station may prompt any active remote device that hasn't reported its position for a substantially long time period, and take appropriate action if a reply is not received. In a vehicle or cargo tracking system, the location transmitter may be configured to report its position when requested by the base station. In this manner, the requests can be managed such that fewer transmissions are requested when the tracked object is detected to be traveling in a remote area, where the potential options for misrouting are few, and more transmissions are requested when the tracked object is within a city. Other opportunities include the remote control of appliances based on messages relayed by users through the base station, and others.

U.S. Pat. Nos. 6,396,819, 6,317,029, 6,985,512, and 6,856,606 present novel techniques for efficiently communicating such short messages between a base station and the remote devices based on the use of a common DSS spreading code and a variety of code-phases at the remote devices, and are incorporated by reference herein. Each remote device independently transmits its message, repeatedly, a number of times. Because the messages are relatively short, and interfering collisions only occurs when the multiple transmissions are concurrent and in phase with each other, a repeated transmission of each message with gaps between the repeated transmissions increases the likelihood that at least one of the multiple copies of the message is properly received at the base station. The likelihood of successful communication can be increased by increasing and varying the number of repeated transmissions, and varying the interval between transmissions. Increasing the number of repetitions of each message may increase the likelihood of successful communication, but it also increases the likelihood of collisions, and as the number of remote devices increases, a saturation point will be reached.

Reception of messages from the base station at the remote devices is not subject to such interfering collisions, because the base station controls when each message is transmitted. However, in many cases, the remote devices are portable units, and the continuous monitoring for independent transmissions from the base station will quickly deplete the batteries in these portable units.

In conventional mobile communication networks, the mobile stations are configured to periodically monitor for notification of messages, and enter an inactive state during periods of inactivity. If a mobile station is notified of a pending message the mobile station is subsequently notified of a time-slot at which the base station will be transmitting the message. A similar protocol is used for allocating time-slots for transmissions. The interval between notifications is generally based on the expected traffic volume and a maximum acceptable lag time between a time at which a message is ready to be transferred from the base station, and the time it is actually transmitted to the receiver, herein termed latency. A long interval between notifications provides a longer inactive period for each remote receiver, conserving battery power, but causes longer latency. A short interval between notifications provides shorter latency, but increases the rate at which a battery will discharge while repeatedly switching to the active state.

A communications service provider using the conventional mobile communication protocols is presented with a dilemma. Should the communications service provide long battery life, or short message delays? In the telecommunications field, that problem is conventionally solved by providing different channels for different modes of operation. Applications with high speed demands, such as voice communications, are handled by one system, while applications with low speed demands, such as pager communications, are handled by another system. In the field of short message communications, a paging application will have substantially higher quality and speed demands than other applications, such as routine vehicle tracking.

In like manner, the provider of a user service, such as a vehicle tracking service, is presented with the dilemma of choosing a provider of high speed or high bandwidth communication to satisfy the requirement of some customers for high resolution (in time or space) vehicle tracking, or a lower-cost provider of low speed or bandwidth for customers who are satisfied knowing the general location of the tracked object during some general time period. This dilemma is further complicated by customers who require different resolutions under different conditions, and expect to pay a service charge that is dependent upon the actual demand/usage of the service. As in the case of the service provider, the traditional solution to a provider of user services that include various, and sometimes varying, levels of demand from its users is to purchase and manage access to multiple systems, each having a particular level of performance, to satisfy the different levels of user demand.

Providing multiple independent systems, however, introduces substantially more overhead than a unified system. For example, each independent system will be configured to handle peak traffic loads, rather than average traffic loads, meaning that much of the system capacity will be unused most of the time. If two independent systems are deployed, the overhead required to accommodate peak traffic loads will be doubled. If a unified system is used, wherein a mix of traffic types are supported, the overhead for accommodating peak traffic loads will only be incurred once. Also, the mix of traffic types is likely to provide a peak traffic load that is less than the sum of the peak traffic loads used in the individual systems, as the different characteristics of traffic types are likely to provide some 'smoothing' of the cumulative peak demand. In like manner, the provider of user services could provide various levels of performance to its users, without incurring the costs associated with managing access to multiple systems based on the required performance.

In the field of short message communication, low per-unit cost is a primary criterion, as well as the ongoing cost of operation. It would be advantageous to reduce the ongoing cost of communication by providing a unified system for handling all types of short-message applications on any channel, thereby obviating the need to provide different systems for each application type. It would be advantageous to reduce the per-unit cost by using substantially the same communications circuitry in each unit, regardless of the intended application for the unit. It would also be advantageous to provide this circuitry as a self-contained 'drop-in' to any short-message communication application. It would also be advantageous to optimize battery life by consuming power in proportion to the requirements of the application. It would also be advantageous to be able to optimize performance by managing the transmissions from the base station based on operational requirements of the application.

These advantages, and others, can be realized by a method and system that allocates one or more frame slots to each transceiver for communication within each message cycle. The number of frame slots allocated can be dynamically adjusted to accommodate variable traffic loads per transceiver, and an offset of the frame slots within the message cycle is preferably predefined to provide a uniform distribution among the transceivers. The design of the transceiver is independent of the particular application, having at least one programmable parameter that controls the number of frame slots allocated within the message cycle. By controlling the number of frame slots allocated to a transceiver, the amount of inactive time, and hence battery life, can be controlled. When a conflict occurs among multiple transceivers having pending messages at the same frame slot, the allocation of the frame slot to a transceiver is based at least in part on the resultant lag time to each transceiver.

In a preferred embodiment, the frame slots assigned to each remote device are consistent within each message cycle, allowing the determination of the frame slots assigned to each unit based solely on an identification of an offset frame slot within the message cycle assigned to the unit and an identification of the allocated interval between assigned frame slots for that remote device. Preferably, the remote device uses an inherent identifying aspect of itself, such as its serial number, MAC address, etc., which is also known to the base station, to determine its assigned offset frame slot, and the base station defines the interval between listening periods for each remote device, based on the bandwidth allocated to the remote device.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

The invention is presented using the paradigm of the allocation of predictable frame slots to each receiver for receiving messages at remote devices from a base station. One of skill in the art will recognize that the principles of this invention can similarly be applied to allocate frame slots for transmission from the remote device to the base station, to reduce the likelihood of collision, except that a guardband time period should be provided between usable frame slots, to accommodate for the different delay times to the base station from the geographically dispersed remote devices. The communication element of the remote devices is referred to as transceivers in this description, to indicate that the principles can be applied to either a receiver or transmitter; the use of this term in this context is not intended to indicate that the remote device must provide both transmission and reception capabilities. The invention is also presented using the paradigm of communication of short messages. One of skill in the art will recognize that although this invention is particularly well suited for short message communications, the principles of this invention are not necessarily limited to such communications. In like manner, the invention is presented using the paradigm of a satellite communication system, because such a system provides a broad coverage area, but one of skill in the art will recognize that the principles of this invention are not limited to satellite systems or broad coverage areas.

Figure 1:
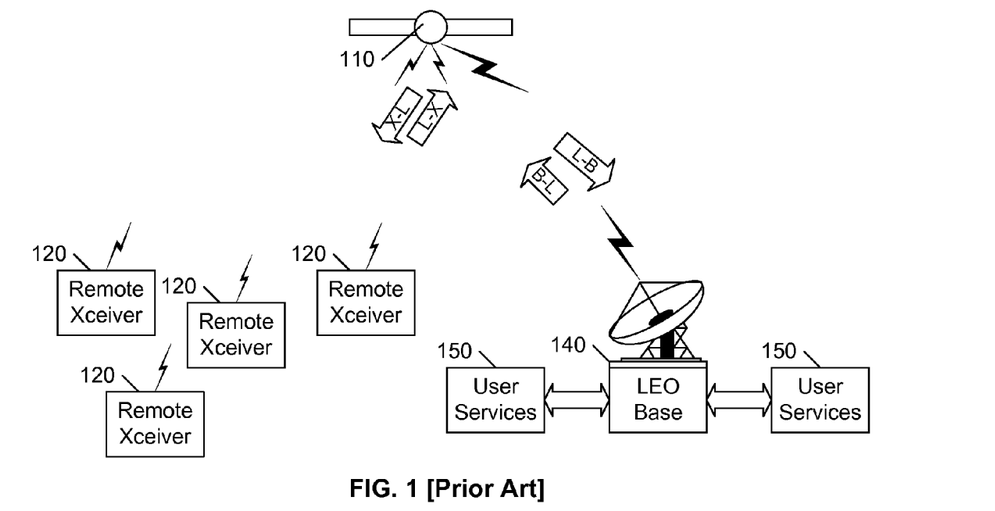
FIG. 1 illustrates an example satellite communication system.

FIG. 1 illustrates an example satellite communication system that uses a satellite 110 in low-earth-orbit (LEO) to provide communications between a base station 140 and a number of remote transceivers 120. Although a higher orbit satellite, such as a geosynchronous (GEO) satellite, may also be used, the use of a lower orbit satellite reduces the transmit power or antenna gain needed between the remote device and the base station. Typically, the satellite will be configured to provide a "bent-pipe" communication link, such that whatever is transmitted from the base station 140 to the satellite 110 is subsequently transmitted from the satellite 110, without any significant changes or processing at the satellite 110.

The base station 140 is configured to provide communications between any of a variety of user service provider systems 150 and compatibly configured remote transceivers 120. For example, if the service provider is providing paging services, the remote transceiver 120 that uses this service will be configured as a pager; if the service provider is providing location tracking services, the remote transceivers that use this service will be configured as location transponders.

The cost of providing a satellite communication system is substantial, and to be profitable, the system should be able to satisfy the requirements of a variety of user service systems 150. In like manner, land-based communication systems are typically subject to substantial infrastructure costs to provide services, and would likely realize a greater profit if a variety of user services are supported. However, as mentioned above, conventional communication protocols do not facilitate a wide range of service requirements, particularly in light of the requirement to optimize power consumption at the remote transceivers.

Figure 2:
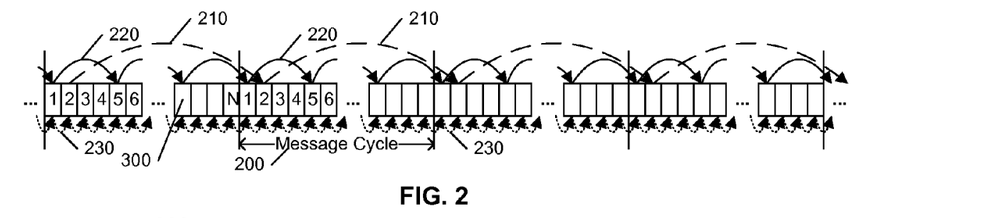
FIG. 2 illustrates an example series of message cycles comprising multiple frames for use in this invention.

FIG. 2 illustrates an example protocol that supports a variety of services having substantially different performance requirements. In the context of this disclosure, performance is characterized by available bandwidth (supportable traffic flow) and/or latency (delay incurred to get a message from the base station to the intended remote device). Some applications/services are sensitive to both of these performance measures, while others may be sensitive to one or the other. A service that needs to continuously provide communication to many remote devices, such as a popular paging service, may be sensitive to bandwidth limitations, but relatively insensitive to the timeliness of the pages. For example, a paging service may require the ability to reliably send a thousand paging messages per minute, but might allow a delay as long as a minute or two between the time that the page was transmitted to the base station and the time that it was received at the remote device. Other applications, such as sending an acknowledgement that places a remote device into an inactive state to conserve power may have a relatively low demand for bandwidth, but may require that the latency is less than a minute. Other applications, such as vehicle tracking systems, may be relatively insensitive to either bandwidth or latency.

To provide optimal power consumption at the remote transceiver, the ratio of 'active' vs. 'inactive' time that the remote transceiver experiences, herein termed the duty-cycle of the remote device, should be commensurate with the bandwidth and/or latency requirements that the particular application imposes on the remote transceiver. If a remote device is only expected to receive/react to one or two messages from the base station per day, its duty-cycle should be extremely low. If the remote device is expected to receive/react to dozens of messages from the host system each minute, its duty cycle can be expected to be higher, but not as high as a remote device that is expected to receive/react to hundreds of messages from the base system each minute.

In accordance with one aspect of this invention, a message cycle time is defined to provide for a given number of message frames. Preferably, the message cycle time corresponds to the maximum allowable duration between activations of the remote device. That is, each currently enabled remote device is expected to monitor for transmissions from the host computer at least once during the message cycle time. If one hour is the longest time period that a currently enabled remote device should remain inactive, then the message cycle time should be set to one hour or less.

In FIG. 2, a remote transceiver that is configured to be activated to listen for messages once per cycle is illustrated by the dashed arrows 210. As illustrated in claim 2, the initial listening period occurs in frame slot "2", then reoccurs at frame slot "2" of each subsequent message cycle. If the message cycle time is one hour, then this remote device will be activated once every hour, to receive any messages addressed to it during the frame slot period. If there are N frame slots in the message cycle, the duty cycle of this remote device will be 1/N (less if the remote device is permitted to enter an inactive state during the frame slot, discussed further below). However, the latency between the time that a message is ready to be transmitted and the time that it is received can be as long as almost twice the duration of the message cycle; in this example, almost two hours. Similarly, the amount of data that can be transmitted to the remote device, herein termed the bandwidth, will be limited to the amount of data that can be communicated to the remote device within one frame slot. The achievable bandwidth will be lower if other remote devices are also allocated the use of the same frame slot "2".

If another remote device requires less latency, or more bandwidth, it can be configured to be activated more than once per message cycle. In the example of a message cycle of one hour, if the remote device is configured to be activated sixty times per message cycle, its latency will be reduced by a factor of sixty, to 2 minutes, and the bandwidth will be increased by a factor of sixty. Commensurate with this decreased latency and increased bandwidth, the duty cycle of this remote device will be increased by a factor of sixty to 60/N, and its power consumption is likely to be increased by a factor of sixty. Thus, the battery life can be optimized by controlling the number of frame slots within a message cycle that are allocated to a remote device based on the required latency or bandwidth.

In FIG. 2, the pattern 220 is indicative of a remote device that is activated every fourth frame slot, and the pattern 230 is indicative of a remote device that is activated for every frame slot, corresponding to continuous activation, as may be provided to a remote device that requires maximum bandwidth or minimum latency and is provided with a continuous source of power (i.e. a "plug-in unit").

In accordance with an aspect of this invention, each remote device is configured to be activated for the same frame slot(s) in each message cycle, and the base station is aware of which frame slots are available for transmitting messages to each remote device. Preferably, the remote device uses an inherent identifying aspect of itself, such as its serial number, MAC address, etc., which is also known to the base station, to determine the initial frame slot to use, and the base station assigns the interval between listening periods to the remote device, based on the bandwidth allocated to the remote device. To provide a consistent set of frame slots to a remote device, the interval between listening periods is an integer result of an integer division of the number of frame slots within the message cycle, the integer divisor corresponding to the activation/listening repetition rate.

For example, if there are 4096 ($2^{12}$) frame slots within a message cycle, a activation rate of 2 frame slots per message cycle provides an interval between activations of 2048 frame slots; an activation rate of 3 is not allowed, because it does not provide an integer result of the division of 4096 by 3. An activation rate of 4 provides an interval between activations of 1024 frame slots. An activation rate of 4096 provides an interval between activations of 1, corresponding to an activation at every frame slot, or virtually continuous activation. In this manner, each remote device and the base station need only know the assigned frame slot offset and repetition rate of the remote device to determine which frame slots are assigned to the remote device.

The number of frame slots N per message cycle is chosen based on a variety of factors. As noted above, a device's duty cycle will be inversely proportional to N, and therefore a large N would be preferred to reduce power consumption by remote devices that have fairly minimal bandwidth and latency requirements. However, in practice, there is always some overhead associated with reactivating a remote device and synchronizing with the assigned frame slot, and the intended power savings may not be achieved when a very short frame slot is used. That is, the overhead duration may be as long as, or longer, than the frame slot duration, such that the power consumption increases at a faster rate than the increased bandwidth provided by the allocation of multiple frame slots to the remote device.

In like manner, due to component tolerances, temperature, and so on, the clock rate at the remote device may be different from the clock rate at the master station, causing a 'drift' of the clock at the remote device relative to the master station. To assure that an assigned listening period is not missed, the remote device is configured to be activated early enough to account for such clock drift. The intended power savings will not be achieved if the clock drift causes the remote device to be activated more than one frame slot before its assigned frame slot. This situation of drifting more than one full frame slot during an interval of N frame slots, will occur if the remote device has a clock drift of 1/N. Therefore, N is preferably no larger than the inverse of the published maximum drift of the clocks intended to be used in the system. In a reasonably low-cost system, clock accuracies of 10-20 ppm over lifetime and temperature are likely to be achieved, suggesting a maximum N of 50 to 100,000, independent of the selected message cycle duration.

As noted above, the message cycle duration can be selected based on the maximum allowable latency. Alternatively, the message cycle duration may be selected as the maximum practical duration given other imposed constraints, thereby providing for a lowest potential energy usage. For example, if a frame slot duration of one second is deemed sufficient to satisfy high performance latency requirements, and N is chosen to be 65536 ($2^{16}$) based on the aforementioned clock drift limitations, a maximum message cycle duration of 65536 seconds (over 18 hours) can be achieved. In such a system, the highest-bandwidth units could potentially receive messages every second, and the lowest-energy units could be inactive 99.997% of the time, thus allowing an extremely broad set of user services to employ the system without compromising on the different priorities of each user service.

The above analysis assumes insignificant overhead time for activating the receiving components relative to the duration of the frame slot interval. If the overhead time is substantial, N is preferably reduced to achieve an appropriate efficiency factor of useful receiving time relative to total activated time (overhead+receiving time).

In a preferred embodiment, each frame slot is partitioned into a plurality of message elements, to allow a plurality of remote devices to receive one or more messages in each assigned frame slot. Each message includes 'overhead information', and therefore a long message slot is preferred, to reduce the relative impact of this overhead information on effective throughput. Shorter message slots, on the other hand, allow for more remote devices to be addressed in each frame slot, providing more options at the base station for balancing performance among the remote devices. Nominally, 10-20 message slots per frame slot provides a reasonable tradeoff between reducing overhead and balancing performance.

Figure 3:
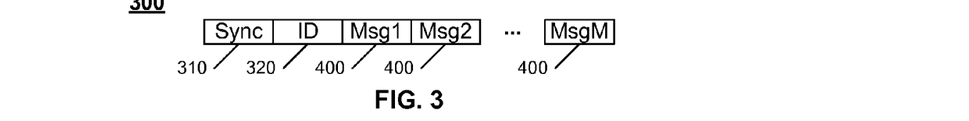
FIG. 3 illustrates an example format of a frame for use in this invention.

As illustrated in FIG. 3, each frame 300 preferably includes a synchronization element 310 and an identification element 320, followed by a plurality of message elements 400. The synchronization element 310 serves to identify the start of each frame 300, to synchronize the remote device to the base station, and the identification element 320 identifies the particular frame slot (1 to N), to allow the remote device to determine that it is monitoring its assigned slot(s).

Each remote device is activated in time to receive the synchronization element 310 and verify that the frame slot identifier 320 corresponds to its assigned frame slot(s). When the proper frame slot identifier 320 is verified, the remote device monitors each message 400 within the assigned frame slot to determine whether the message is intended for reception at the particular remote device. The remote device re-enters the inactive state at the end of the frame 300, or at the end of messages 400 within the frame 300. One or more techniques may be used to further reduce the time that a remote device must remain active to monitor messages. If, for example, each device is allocated a maximum of one message per message cycle, the device can enter the inactive state after receipt of its message, if any. In like manner, the base station may be configured to transmit messages within each frame in some particular order, so that when a device recognizes that a message having a 'later' order is received, the device can enter an inactive state. The order may be assigned to each device by the base station based on an order associated with each application, and included in a field of each message. In this manner, the providers of the application may pay a premium for an 'early' order to prolong the battery-life of their corresponding devices.

Figure 4:
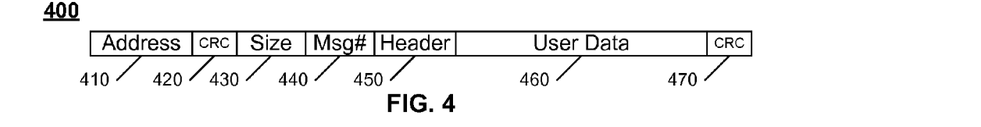
FIG. 4 illustrates an example format of a message for use in this invention.

Each message is structured in a conventional manner, an example structure being illustrated in FIG. 4. An address field 410 is used to address the message to a particular remote device, or group of remote devices, and an error detection/verification field 420 assures the accuracy of this address. This error detection/verification field may cover the entirety of the message; or, it may cover only the header, including destination address and message length, so that devices which are not addressed may recognize and confirm that fact immediately, and go into a lower-power state for the remaining duration of the message. Optionally, the remote devices may be configured to store an indicator of the particular application for which it is being used, to facilitate addressing all of the devices used by an application concurrently, for issuing application-wide notices or commands. For example, an application that experiences periods of substantially different bandwidth demands may adjust the activation rate of all its remote devices accordingly, using such a group address.

Optionally, the message includes a size field 430, to provide compatibility with different configurations of the frames. For example, the base station may be configured to dynamically adjust the number of messages within the frames 300, or within select frames 300, based on the current traffic flow, with a corresponding adjustment of the length of each message in each frame. Providing a size field 430 also allows for the use of variable length messages, so that power is consumed in proportion to the amount of message information that is transmitted.

The message number field 440 allows for the identification and elimination of redundant messages, and for requesting retransmission of missing messages. The header field 450 includes conventional message identification information, such as an identifier of the source of the message, the type of message, and so on. The message data 460 follows the header, and an error detection and/or correction field 470 follows thereafter.

Figure 5:
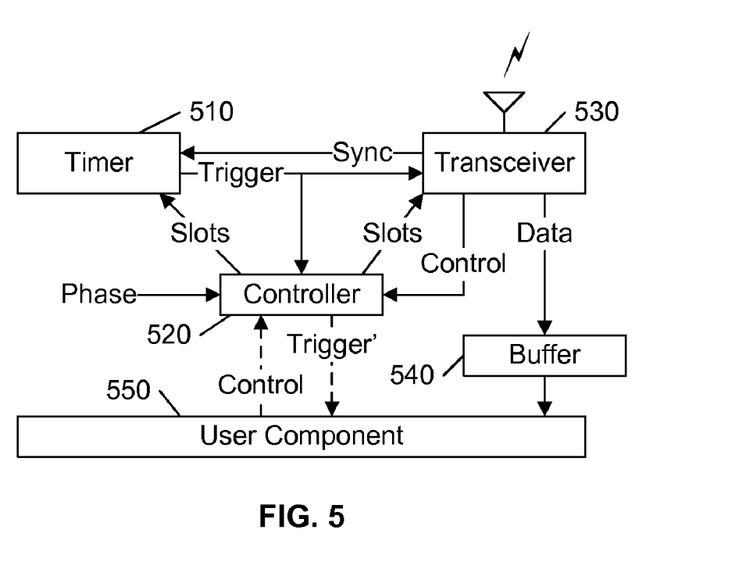
FIG. 5 illustrates an example block diagram of a receiver for use in this invention.
Figure 6:
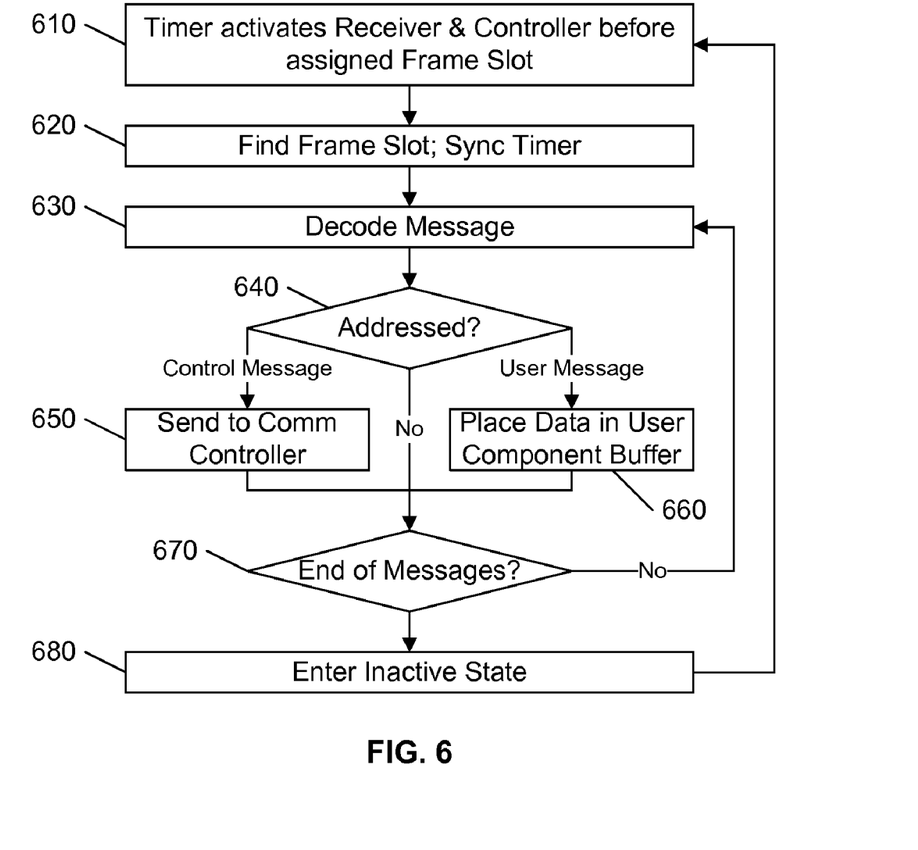
FIG. 6 illustrates an example flow diagram of a receiver for use in this invention.

FIG. 5 illustrates an example block diagram of components of a receiving sub-system of a remote device for use with this invention, and FIG. 6 illustrates an example flow diagram of the operation of an example receiver. In the following description, the initial digit of the reference numeral indicates the figure in which the numeral can be found. As noted above, the principles of this invention can be used for communication in either direction, or both directions (to and from the remote devices). The operation of the system for communications to the remote devices is presented herein for ease of understanding, the operation for communications in the reverse direction being evident to one of skill in the art in view of this presentation. As also noted above, the term transceiver is used in this specification, drawings, and claims to represent either a receiver, or a transmitter, or a combination of receiver and transmitter. The term receiver is used in the context of this example of the communication of messages to the remote device, to facilitate understanding, and in the case of a combination of receiver and transmitter, refers to the receiving element of such a combination transceiver.

A timer 510 is configured to provide a wake-up/trigger signal to the other components in the remote device at each frame slot that is assigned to the remote device. Each frame slot (1, 2, ... N) of the message cycle begins at a particular start point, or offset (0, 1/N, 2/N, ... (N−1)/N), in the cycle, and the timer 510 is configured to activate the other components sufficiently ahead of the start point of each assigned slot such that the receiver is sufficiently enabled to detect the start of each assigned frame.

Referring to the example frame structure of FIG. 3, upon enabling 610, the receiver 530 monitors the incoming signal to detect the sync element 310, typically a known pattern of bits. Upon detecting the sync element 310, the receiver 530 preferably sends a corresponding sync signal to the timer 510, to allow the timer to correct for clock drift between the remote device and the base station. The receiver then decodes the ID element 320, which identifies the particular frame slot, preferably as an incremental count. If this frame slot corresponds 620 to the assigned slot, the receiver 510 continues to receive and decode 630 the subsequent message elements 400.

If the ID element 320 indicates a frame slot that is prior to the assigned frame slot, the receiver waits for the next sync element 310, optionally entering an inactive state for the interim. If the ID Element 320 indicates a frame slot subsequent to the assigned frame slot, this indicates that the timer 510 had not enabled the receiver in time to receive the assigned frame slot, and the timer 510 is adjusted accordingly, to avoid missing subsequent messages. In like manner, in the aforementioned case of the ID element 320 indicating that the received frame slot was prior to the assigned frame slot, this indicates that the timer 510 had enabled the receiver earlier than necessary to receive the assigned frame slot, and the time 510 can be adjusted accordingly, to optimize the duty cycle. Lead-lag timing adjustment techniques are common in the art.

A controller 520 is configured to inform the timer 510 and receiver 530 of the assigned frame slots for this particular remote device. As discussed above, the assigned frame slots are preferably consistent within each message cycle, allowing the determination of the assigned frame slots based on an identification of a start of a frame slot within the message cycle, hereinafter termed the offset of the assigned frame slots, and the number of frame slots between assigned frame slots, hereinafter termed the reception frame interval.

The offset of each remote device may be assigned in any conventional manner, but in a preferred embodiment, the offset of each remote device is based on a unique identifier of the remote device, such as its serial number. For example, if there are $2^k$ frame slots within a message cycle, the last k bits of the serial number can defined as the offset of the remote device, and the manufacturing process includes setting bits in a memory, or connections on a PC board, to allow the controller 520 to read these k bits. In this manner, the assigned offsets are likely to uniformly distributed across the message cycle, thereby providing a degree of static load balancing among the phases, increasing the overall throughput of the system. Other techniques for assigning different offsets to communicating elements are common in the art, including, for example, having each remote device default to a common phase, typically zero, then monitoring at that offset for a command message from the base station that assigns the offset to each remote device using a registration protocol.

The reception frame interval of each remote device may also be provided by setting bits in memory or connections on a PC board, but in a preferred embodiment, the reception frame interval of each remote device is defined dynamically, typically by the base station, based on a fee paid for different levels of service, or other factors. In a preferred embodiment of this invention, the messages that are transmitted in each frame slot are identified 640 as control messages for the communications system controller 520, user-data messages for processing by the user component 550, or messages that are addressed to other remote devices in this frame slot.

The control messages that are sent 640 to the controller 520 include the reception frame interval, and other communication-management information, such as the assigned address of user component 550. Messages addressed to the user component 550 are placed 650 in a buffer for acquisition by the user component 550. This decoding process is repeated until 670 all messages in the frame are processed. The remote device, or at least the reception portion of the remote device, is then placed in a low-power inactive state until the timer 510 reawakens 610 the receiver 530 and controller 520.

The user component 550 is the application-specific portion of the remote device, and includes, for example, sensing equipment, GPS receiver, and so on. The user component provides messages to the base station for forwarding to the corresponding user services (150 in FIG. 1) via a transmit portion of the remote device (not illustrated). Optionally, the user component 550 is configured to be triggered by the controller 520 when messages arrive, and to pass control information to the controller 520, including, for example, a notification of a change to the reception frame interval. For example, in lieu of using different addresses to distinguish the communication control information and user component data, the task of segregating the control and data by the receiver 530 may alternatively be performed by the user component 550, based on content of the received data. In like manner, although the base station will typically control the reception bandwidth and notify the remote device of any changes via the aforementioned control messages, in an alternative embodiment, the protocol may allow the user application to control the bandwidth directly.

It should be noted that the timing diagram of FIG. 3 illustrates a time-based multiplexing of messages among multiple remote devices; that is, the first message element may be addressed to one receiver, the next message element to another, and so on. It will be evident to one of skill in the art that other multiplexing techniques may be used as well. For example, each remote device may be assigned a particular code-phase of a DSS spreading code, and the base station can be configured to concurrently transmit messages at different code-phases. Conceptually, this is equivalent to operating within multiple communication channels, each channel being defined by the code-phase used at the base station for encoding the messages addressed to the remote devices assigned the corresponding code-phase. The base station will concurrently transmit the message cycle at each of the different code-phases. At the remote device, only the message cycle with transmitted sync frames 310 that corresponds to the assigned code-phase of the particular remote device will be recognized, and subsequently, only the messages corresponding to this message cycle will be decoded.

In a preferred embodiment, a portion of the remote device's serial number is used as the code-phase assigned to the remote device. For example, if the lower k-bits are used to define the assigned frame slot of each remote device, the next higher set of bits can be used to define the code-phase assigned to the remote device. Using, for example, the lower sixteen bits of the remote device's serial number, twelve of the bits can be used to assign one of 4096 available frame slots, and the remaining four bits can be used to assign one of 16 available code-phase-defined DSS channels. The particular selection of bits to be used for code-phase assignment and frame-slot assignment is immaterial if substantially more than $2^{16}$ remote devices are manufactured. On the other hand, if fewer than $2^{16}$ units are expected to be manufactured for use in the deployed system, the code-phase may preferably be based on the lower four bits, to assure a relatively uniform distribution among code-phases. Other techniques for uniformly distributing code-phase and frame-slot-offset will be evident to one of skill in the art; for example, $2^k$ frame-slot-offsets may be defined by the k lower-order even bits of the serial number, and $2^j$ code-phases may be defined by the j lower-order odd bits of the serial number.

Figure 7:
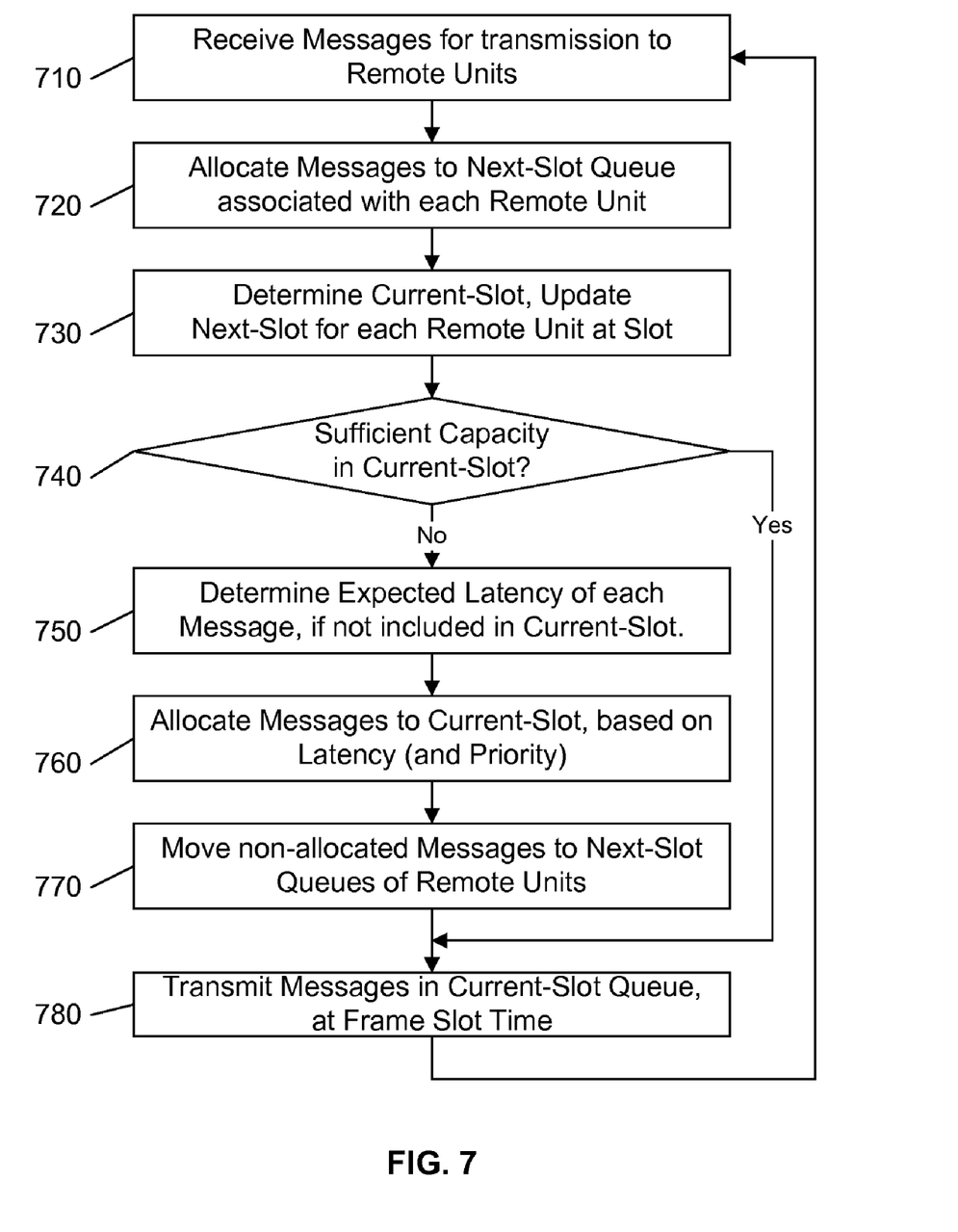
FIG. 7 illustrates an example flow diagram of a base station for use in this invention.

FIG. 7 illustrates an example flow diagram of a transmission process at the base station 140 that embodies aspects of this invention. The flow chart illustrates a sequential flow, for ease of understanding; one of skill in the art will realize that the individual processes may be performed in parallel, and/or in a different sequence than illustrated in FIG. 7.

At 710, the base station receives messages addressed to remote devices 120 from user service providers 150. As detailed above, each remote device 120 is assigned one or more frame slots in each message cycle. The base station maintains a queue associated with each frame slot, and as each message is received, it is placed in the queue associated with the next-in-time frame slot that is assigned to the remote device, at 720.

At 720, the next-to-be-transmitted frame slot is defined as the current-frame slot for processing. The next-to-be-transmitted frame slot for each remote device associated with the current-frame slot is updated, by modulo-adding the frame-slot interval of each remote device to the current-frame slot number.

If, at 730, the number of messages in the current-slot queue can be transmitted within a single frame-slot, the messages in the current-slot queue are transmitted at the time within the message cycle corresponding to the current-slot, at 780. As noted above, this transmission will occur in parallel with the other processes in FIG. 7, so that the processing 710-770 of the received messages will be performed while the previously processed messages are being transmitted.

If, at 740, there are more messages in the current-slot queue than can be transmitted during the current-slot duration, the messages in the queue are assessed to determine which messages to select for transmission.

In accordance with an aspect of this invention, messages are selected for transmission based on an estimate of the latency that will be experienced by each message if the message is not selected for transmission in the current frame slot. At 750, a latency factor is determined based on the latency factor that has already been incurred for the message, plus the frame slot interval associated with the addressed remote device. Preferably, this latency factor is also weighted based on a priority factor associated with each remote device, or each message:

$$\text{Latency}(i)=\text{Latency}(i)+P(j)*\text{Interval}(j), \qquad (1)$$

where i is the message identifier, j is the remote device identifier, P(j) is a priority associated with the remote device (or, P(i), a priority associated with the message, can be used), and Interval(j) is the frame slot interval currently assigned to the remote device to which the message is addressed. Other ranking schemes that combine latency and priority will be evident to those skilled in the art.

By basing the selection on latency, as well as priority, low priority messages will not be continuously overwhelmed by higher priority messages. Typically, priorities are allocated on a scale of 1-10, or 1-100. If a particular remote device is allocated only one frame slot per message cycle of 65536 frame slots, for example, its latency factor of 65536 will likely cause it to be ranked highly, particularly against messages with short frame-rate intervals, even if they have substantially higher priorities.

The messages with the highest latency factor are selected to remain in the current-slot queue, at 760, and the non-selected messages are moved to the next-to-be-transmitted queues for each of the addressed remote devices (which queues were updated at 730), at 770. These messages will be processed with any newly received messages when each of the next-to-be-transmitted queue becomes the current-slot queue. Because the latency factor is cumulative, these delayed messages will have a higher priority-latency ranking than similar recently received messages in the next-to-be-transmitted queue.

The messages that were selected for transmission are transmitted at the current-slot time, at 780, and the process is repeated for the next sequential frame slot. The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A communication system comprising:
a base station that is configured to communicate messages in a plurality of frame slots within a message cycle, wherein the base station is configured to transmit the messages based on a single DSS spreading code; and
a plurality of transceivers, each transceiver being configured to be activated at an assigned frame slot offset and at an assigned frame slot interval within the message cycle, to facilitate communication of messages between the base station and the transceiver during a number of frame slots within the message cycle based on the offset and interval, at least two of the transceivers having different frame slot offsets and frame slot intervals, wherein each of the transceivers are configured to decode the messages based on the single DSS spreading code and a substantially fixed code-phase that is associated with each transceiver, and wherein a common code-phase is concurrently associated with multiple transceivers.

2. The communication system of claim 1, wherein the base station is configured to assign the frame slot interval to at least one transceiver of the plurality of transceivers, based on a bandwidth parameter associated with the at least one transceiver.

3. The communication system of claim 2, wherein the offset of each transceiver is based on a substantially unique identifier of the transceiver.

4. The communication system of claim 3, wherein the unique identifier corresponds to one of a serial number and a MAC address.

5. The communication system of claim 1, wherein the offset of each transceiver is based on a substantially unique identifier of the transceiver.

6. The communication system of claim 1, wherein multiple transceivers share a common offset, and each message includes an address field that identifies one or more intended recipients of the message.

7. The communication system of claim 1, wherein the base station is configured to communicate an indicator of an intended activation rate to one or more of the transceivers, and the transceivers are configured to modify the interval based on the indicator of the intended activation rate.

8. The communication system of claim 1, wherein an assignment of the code-phase associated with each transceiver is such that different code-phases are assigned to transceivers having a common offset.

9. The communication system of claim 8, wherein the assignment of the code-phase and the fixed identifier of the transceiver is based on a substantially unique fixed identifier of each transceiver.

10. The communication system of claim 9, wherein the assignment of the code-phase is based on a first set of bits of the fixed identifier, and the assignment of the offset is based on a second set of bits of the fixed identifier.

11. The communication system of claim 1, wherein the base station is configured to prioritize the messages based on a latency factor that is based on the interval assigned to each corresponding transceiver.

12. The communication system of claim 1, wherein the base station is coupled to the transceivers via a satellite.

13. The communication system of claim 1, wherein the base station is configured to transmit synchronization messages that serve to maintain synchronization between the base station and each transceiver.

14. A base station comprising:
a timer that is configured to partition a message cycle into a number of frame slots,
a transmitter that is configured to transmit the messages based on a single DSS spreading code and a code-phase of the spreading code associated with each of one or more remote devices, wherein a common code-phase is concurrently associated with multiple remote devices; and
a controller that is configured to:
receive messages from one or more service units, each message being addressed to one or more remote devices,
allocate each message to one or more slot queues based on the addressed remote device, and
control the transmitter to transmit the messages in each slot queue during a corresponding frame slot,
wherein
each of the one or more remote devices has an associated frame slot offset and frame slot interval, and the controller allocates each message based on one or more defined frame slots based on the offset and interval, and
at least two of the remote devices have differing frame slot offsets and frame slot intervals, and
an assignment of the code-phase associated with each remote device is such that different code-phases are assigned to remote devices having a common offset.

15. The base station of claim 14, wherein the base station is configured to assign the frame slot interval of each remote device based on a desired duty cycle of the remote device.

16. The base station of claim 15, wherein the desired duty cycle of the remote device is based on at least one of a desired bandwidth and a desired power consumption at the remote device.

17. The base station of claim 14, wherein the frame slot offset of each remote device is based on a substantially unique identifier of the remote device.

18. The base station of claim 14, wherein the controller is configured to prioritize the messages allocated to each slot queue that exceeds a capacity of the frame slot, based on a latency factor that is based on the frame slot interval of each addressed remote device.

19. The base station of claim 14, wherein an assignment of the code-phase and the offset associated with each remote device are based on a substantially unique fixed identifier of each remote device.

20. The base station of claim 19, wherein the code-phase is based on a first set of bits of the fixed identifier, and the offset is based on a second set of bits of the fixed identifier.

21. The base station of claim 14, wherein the transmitter is configured to communicate with the remote devices via a satellite.

22. The base station of claim 14, wherein the transmitter is configured to transmit synchronization messages that serve to maintain synchronization between the base station and each remote device.

* * * * *